(12) United States Patent
Aihara

(10) Patent No.: US 10,006,503 B2
(45) Date of Patent: Jun. 26, 2018

(54) RELEASE BEARING AND CLUTCH RELEASE BEARING DEVICE

(71) Applicant: NSK LTD., Tokyo (JP)

(72) Inventor: Haruyuki Aihara, Fujisawa (JP)

(73) Assignee: NSK LTD., Tokyo (JP)

( * ) Notice: Subject to any disclaimer, the term of this patent is extended or adjusted under 35 U.S.C. 154(b) by 106 days.

(21) Appl. No.: 15/100,792

(22) PCT Filed: Dec. 10, 2014

(86) PCT No.: PCT/JP2014/082739
§ 371 (c)(1),
(2) Date: Jun. 1, 2016

(87) PCT Pub. No.: WO2015/093376
PCT Pub. Date: Jun. 25, 2015

(65) Prior Publication Data
US 2016/0312839 A1    Oct. 27, 2016

(30) Foreign Application Priority Data

Dec. 16, 2013 (JP) ................. 2013-259028
Jun. 24, 2014 (JP) ................. 2014-128778
Aug. 25, 2014 (JP) ................. 2014-170383

(51) Int. Cl.
  *F16D 23/14*  (2006.01)
  *F16C 33/78*  (2006.01)
  *F16C 19/16*  (2006.01)

(52) U.S. Cl.
  CPC .............. *F16D 23/14* (2013.01); *F16C 19/16* (2013.01); *F16C 33/7853* (2013.01);
  (Continued)

(58) Field of Classification Search
  CPC .... F16D 23/14; F16D 2300/08; F16D 23/147; F16D 23/148; F16C 19/16; F16C 33/7823; F16C 33/7853
  See application file for complete search history.

(56) References Cited

U.S. PATENT DOCUMENTS

2011/0129175 A1    6/2011  Suzuki et al.
2012/0213464 A1*   8/2012  Stautner ............... B60G 15/067
                                                    384/607
2012/0321489 A1   12/2012  Murakami et al.

FOREIGN PATENT DOCUMENTS

DE    10 2012 208 953 A1   12/2013
EP              0816699 A1 *  1/1998  .......... F16C 33/7853
(Continued)

OTHER PUBLICATIONS

Definition of Labyrinth, obtained from www.oxforddictionary.com on Nov. 9, 2017 (Year: 2017).*
(Continued)

*Primary Examiner* — Stacey A Fluhart
(74) *Attorney, Agent, or Firm* — Sughrue Mion, PLLC

(57) ABSTRACT

A radial non-contact lip (26) having a tip edge that is positioned further radially inward than is the inner peripheral surface at an axial end of an inner ring (7) is formed on the inner peripheral edge of a seal ring (20) that axially faces a flange part (18*a*) constituting a bearing holder (3*a*), the seal ring (20) being one of a pair of seal rings (20, 9*b*) that close the openings at the two axial ends of a release bearing (2*a*). A labyrinth seal (30) is formed, between the axial-side surface of the radial non-contact lip (26) and the axial end surface of the inner ring (7), radially inward from a sliding contact part (40) between the tip edge of a contact lip (12*a*) and the axial inner end surface of the inner ring (7).

4 Claims, 16 Drawing Sheets

(52) U.S. Cl.
CPC ........ *F16C 19/163* (2013.01); *F16C 2361/43* (2013.01); *F16D 2300/08* (2013.01)

(56) References Cited

FOREIGN PATENT DOCUMENTS

| | | | |
|---|---|---|---|
| EP | 2 287 486 A1 | 2/2011 | |
| JP | 2-138230 U | 11/1990 | |
| JP | 11-230193 A | 8/1999 | |
| JP | 2001-280367 A | 10/2001 | |
| JP | 2004-176782 A | 6/2004 | |
| JP | 2009-144895 A | 7/2009 | |
| JP | 2009180309 A * | 8/2009 | ............ F16D 23/14 |
| JP | 2011-80575 A | 4/2011 | |
| JP | 2013-2499 A | 1/2013 | |
| WO | WO-2009145216 A1 * | 12/2009 | ............ F16C 19/163 |

OTHER PUBLICATIONS

Search Report dated Nov. 18, 2016 issued by the European Patent Office in counterpart European Patent Application No. 14870843.1.
International Search Report, issued by International Searching Authority in corresponding International Application No. PCT/JP2014/082739, dated Feb. 24, 2015. (PCT/ISA/210).
Written Opinion, issued by International Searching Authority in corresponding International Application No. PCT/JP2014/082739, dated Feb. 24, 2015. (PCT/ISA/237).
Office Action dated Dec. 5, 2017 by the State Intellectual Property Office of P.R. China in counterpart Chinese Patent Application No. 201480068228.2.

* cited by examiner

RELEASE BEARING AND CLUTCH RELEASE BEARING DEVICE

TECHNICAL FIELD

The present invention relates to improvements on a release bearing and a clutch release bearing device, which are to be incorporated into a clutch mechanism of a manual transmission for a vehicle and are to be used to press or pull a diaphragm spring when performing a shifting operation.

RELATED ART

A clutch mechanism attached to a manual transmission includes a flywheel configured to rotate together with a crankshaft of an engine, a clutch disk arranged to face the flywheel, a pressure plate configured to press the clutch disk towards the flywheel, a diaphragm spring configured to press the pressure plate towards the clutch disk, and a clutch release bearing device configured to be moveable along a shaft for power transmission, to change an inclined angle of the diaphragm spring as it is moved, and to control connection and disconnection between the flywheel and the clutch disk.

As the above clutch mechanism, a push type and a pull type have been conventionally used. When disconnecting a clutch (separating the flywheel and the clutch disk so that a rotating force of the crankshaft is not transmitted to the transmission through the shaft), a push-type clutch mechanism presses a central portion of the diaphragm spring. When disconnecting the clutch, a pull-type clutch mechanism pulls the central portion of the diaphragm spring.

When disconnecting the clutch, any of the clutch mechanisms axially displaces the clutch release bearing device by a release fork configured to swing as a clutch pedal is stepped down. Any one bearing ring of the release bearing configuring the clutch release bearing device is engaged to the central portion of the diaphragm spring directly or via another member, so that the central portion of the diaphragm spring is pressed or pulled. At this state, the clutch release bearing device prevents the respective parts from being slid and rubbed each other, based on the relative rotations of the one bearing ring and the other bearing ring, irrespective of the rotation of the diaphragm spring.

FIGS. 15 to 17 show an example of the conventional structure of the clutch release bearing device. A shown clutch release bearing device 1 is to be incorporated into a push-type clutch mechanism, and has a release bearing 2 and a bearing holder 3 configured to hold the release bearing 2.

The release bearing 2 is a ball bearing including an outer ring (a stationary ring) 5 having an outer ring raceway 4 of a deep groove type formed on an inner periphery thereof, an inner ring (a rotary ring) 7 having an inner ring raceway 6 of an angular type formed on an outer periphery thereof, a plurality of balls 8, 8 provided to be freely rollable between the outer ring raceway 4 and the inner ring raceway 6, and a pair of seal rings 9a, 9b. In the shown example, the deep groove type is used as the outer ring raceway 4, and the angular type is used as the inner ring raceway 6. For this reason, the release bearing 2 can bear thrust load of a right direction in FIG. 15 as well as radial load. Also, the inner ring 7 is configured by pressing a steel plate, and has a pushing part 10 for pressing the central portion of the diaphragm spring (not shown), which is formed by projecting one axial end portion (a left end portion of FIG. 15) axially from an inner diameter-side of the outer ring 5 and then bending a tip edge thereof radially outward.

Outer peripheral edge portions of the respective seal rings 9a, 9b are engaged with fitting grooves 11, 11 formed at both axial end portions of the inner periphery of the outer ring 5. Also, inner diameter-side end portions of both the seal rings 9a, 9b are respectively provided with contact lips 12a, 12b and non-contact lips 13a, 13b having different shapes and configured to perform the same function, one by one. Regarding the seal ring 9a, which is provided at the other axial side (a rear side; a right side in FIGS. 15 and 17), of both the seal rings 9a, 9b, a tip edge of the contact lip 12a provided at the inner peripheral edge portion is contacted to the other axial end surface of the inner ring 7 over an entire circumference and a tip edge of the non-contact lip 13a is arranged to closely face an outer periphery of the other axial end portion of the inner ring 7 over the entire circumference. In contrast, regarding the seal ring 9b, which is provided at one axial side (a front side; a left side in FIGS. 15 and 17), of both the seal rings 9a, 9b, a tip edge of the contact lip 12b provided at the inner peripheral edge portion is contacted to an outer periphery of an axial intermediate portion of the inner ring 7 over an entire circumference and a tip edge of the non-contact lip 13b is arranged to closely face the outer periphery of the axial intermediate portion of the inner ring 7 over the entire circumference.

The bearing holder 3 is configured by combining a resin molded component 14, a pair of retaining springs 15, 15 and an anvil 16. The resin molded component 14 has a circular ring shape as a whole by an easily slidable synthetic resin. The resin molded component 14 has a cylindrical sleeve 17 fitted to an outer side of a guide shaft (not shown) disposed in an axial direction of the diaphragm spring so that the cylindrical sleeve 17 is moveable along the guide shaft, a flange part 18 having a circular ring shape and protruding radially outward from an outer periphery of an intermediate portion of the sleeve 17, and a pair of guide plate parts 19, 19 extending from two radially opposite positions of an outer peripheral edge of the flange part 18 towards the other axial side and parallel with each other. Side surfaces of both the guide plate parts 19, 19, which face each other, are used as guide surfaces for guiding a tip portion of a release fork (not shown).

The pair of retaining springs 15, 15 is made of a metal plate having sufficient elasticity. The release bearing 2 is supported to one axial side surface (a left side surface of FIGS. 15 and 17) of the flange part 18 by the retaining springs 15, 15 mounted at two radially opposite positions of the flange part 18 so that it can be slightly displaced with respect to a radial direction. This is to provide the release bearing 2 with a self-aligning property with respect to the diaphragm spring.

The anvil 16 is made by a metal plate having sufficient stiffness and is attached to the other axial side surface (a right side surface in FIG. 15) of the flange part 18. A side surface (a right side surface in FIG. 15) of the anvil 16 opposite to the flange part 18 is used as a pressed surface that is to be pressed by the tip portion of the release fork.

When mounting the clutch release bearing device 1 configured as described above to a push-type clutch mechanism, the clutch release bearing device 1 is arranged between the central portion of the diaphragm spring and the tip portion of the release fork, and the sleeve 17 is fitted to the outer side of the guide shaft so that the sleeve 17 can be moved along the guide shaft. At this state, when a driver steps on a clutch pedal for shifting operation, the release fork swings and a side surface of the anvil 16 is pressed by the tip portion of the release fork. As a result, the clutch release bearing device 1 moves towards the diaphragm spring along the guide shaft, so that the tip surface of the pushing part 10 is contacted to the central portion of the diaphragm spring and the central portion of the diaphragm spring is pressed by the pushing part 10. As a result, a well-known mechanism operates, so that the connection of the clutch is disconnected.

In recent years, as the engine performance is improved, an amount of heat generation of the engine tends to increase. For this reason, it is considered to provide air holes for cooling for a clutch housing configured to cover a clutch device so as to prevent an increase in temperature around the engine (for example, refer to Patent Document 1). When the air holes are provided, foreign matters such as muddy water are introduced from an outside through the air holes, and the clutch release bearing device arranged in the clutch housing may be exposed to the foreign matters such as muddy water. For this reason, it is needed to improve the sealing performance of the release bearing configuring the clutch release bearing device.

The inventors have made many tests so as to find out an introduction route of the muddy water into the release bearing until the present invention has been completed. As a result, the inventors found that the foreign matters are introduced through the engaged portions between the outer peripheral edge portions of the seal rings 9a, 9b and the fitting grooves 11 of the outer ring 5 by which the seal rings 9a, 9b are fixed to the outer ring 5. The fitting portions (the outer peripheral edge portions) of the seal rings 9a, 9b are made of only an elastic seal material. The fitting portions are press-fitted in the fitting grooves 11 with an axial interference (with axially compressed). Therefore, when the seal rings 9a, 9b are press-fitted in the fitting grooves 11, the fitting portions of the seal rings 9a, 9b having low stiffness are deformed, so that adhesiveness between the fitting grooves 11 and the fitting portions is lowered. For this reason, when the clutch release bearing device is used under severe environments, the foreign matters are likely to be introduced through the engaged portions between the fitting grooves 11 and the fitting portions.

Also, as shown with an arrow in FIG. 17, the inventors found that the muddy water is introduced between the outer periphery of the sleeve 17 and the inner periphery of the inner ring 7 at a part positioned at a lower end of the clutch release bearing device 1 at a using state. The muddy water stays in a gap space 38 between the seal ring 9a at the other axial side and the flange part 18. As shown in FIG. 17, when a water level of the muddy water becomes higher, a sliding contact part 40 between the contact lip 12a and the other axial end surface of the inner ring 7 is submerged in the muddy water. Therefore, the inventors found that the muddy water is likely to be introduced into the release bearing 2 through the sliding contact part 40.

Based on the above test results, it is effective to improve the sealability (muddy water resistance) of the seal ring 9a at the other axial side for improving the sealing performance of the release bearing 2. Therefore, it is considered to increase the interference of the contact lip 12a configuring the seal ring 9a. In this case, however, the sealability can be improved but activating torque and rotating torque of the release bearing 2 are excessively increased. Also, it is considered to add a new seal ring for improving the sealing performance. However, in this case, a bearing size, a weight, a number of components and cost of the release bearing 2 increase. When it is intended to improve the sealing performance of the seal ring 9a, like Patent Document 2, the size of the release bearing increases.

CITATION LIST

Patent Documents

Patent Document 1: Japanese Patent Application Publication No. 2001-280367A
Patent Document 2: Japanese Patent Application Publication No. 2009-144895A

SUMMARY OF THE INVENTION

Problems to be Solved

The present invention has been made in view of the above situations, and an object of the present invention is to implement a release bearing capable of improving sealing performance thereof and a clutch release bearing device having the release bearing.

Means for Solving the Problems

In order to achieve the above object, the present invention has following features.

(1) A release bearing including:
an outer ring having an outer ring raceway formed on an inner periphery thereof,
an inner ring having an inner ring raceway formed on an outer periphery thereof,
a plurality of rolling elements provided to be freely rollable between the outer ring raceway and the inner ring raceway, and
a pair of seal rings of which outer peripheral edge portions are respectively to be engaged to inner peripheries of both axial end portions of the outer ring, the seal rings being configured to close openings at both axial ends of a space which exists between the inner periphery of the outer ring and the outer periphery of the inner ring and in which the rolling elements are provided,
wherein an inner diameter-side end portion of one of the pair of seal rings is provided with a contact lip of which a tip edge is sliding-contacted to an axial end surface of the inner ring over an entire circumference and a non-contact lip of which a tip edge is arranged to closely face an outer periphery of an axial end portion of the inner ring over an entire circumference,
wherein an inner peripheral edge portion of the one seal ring is provided with a radial non-contact lip extending radially inward from an inner peripheral edge portion of the contact lip and having a tip edge positioned at a more radially inner side than an inner periphery of the axial end portion of the inner ring, and
wherein a labyrinth seal is formed between the axial end surface of the inner ring and an axial side surface of the radial non-contact lip, radially inward from a sliding contact part between the tip edge of the contact lip and the axial end surface of the inner ring.

(2) In the release bearing of (1), one of axial side surfaces of the contact lip, which is an opposite surface to a surface facing the axial end surface of the inner ring, is provided with an axial non-contact lip extending axially.

(3) In the release bearing of (1), the inner peripheries of both axial end portions of the outer ring are provided with fitting grooves in which fitting portions of the pair of seal rings are to be fixed, the pair of seal rings has a core bar and a seal material respectively, and the core bar extends towards the fitting portion with being covered by the seal material.

(4) A clutch release bearing device including:

a bearing holder having a cylindrical sleeve configured to be slidable along a shaft and a flange part having a circular ring shape and protruding radially outward from an outer periphery of the sleeve, and a release bearing supported to one axial side of the flange part, wherein the release bearing is the release bearing according to one of (1) to (3), wherein the one seal ring axially faces the flange part, and wherein a recessed groove for drainage configured to enable a gap space between one axial side surface of the flange part and the other axial side surface of the seal ring and an external space existing radially outward from the outer ring to communicate with each other is formed at a part, which is positioned at a lower end at a using state, of one axial side surface of the flange part.

(5) In the clutch release bearing device of (4), a tip edge of the radial non-contact lip is arranged to closely face the sleeve or the flange part over an entire circumference.

(6) A clutch release bearing device including:

a bearing holder having a cylindrical sleeve configured to be slidable along a shaft and a flange part having a circular ring shape and protruding radially outward from an outer periphery of the sleeve, and a release bearing supported to one axial side of the flange part, the release bearing including: an outer ring having an outer ring raceway formed on an inner periphery thereof, an inner ring having an inner ring raceway formed on an outer periphery thereof, a plurality of rolling elements provided to be freely rollable between the outer ring raceway and the inner ring raceway, and a pair of seal rings of which outer peripheral edge portions are respectively to be engaged to inner peripheries of both axial end portions of the outer ring, the seal rings being configured to close openings at both axial ends of a space which exists between the inner periphery of the outer ring and the outer periphery of the inner ring and in which the rolling elements are provided, wherein a recessed groove for drainage configured to enable a gap space between the flange part and the seal ring facing the flange part and an external space existing radially outward from the outer ring to communicate with each other is formed at a part, which is positioned at a lower end at a using state, of an axial end portion of the outer ring facing the flange part.

Effect of the Invention

According to the present invention having the configuration as described above, it is possible to implement the release bearing capable of improving the sealing performance and the clutch release bearing device having the release bearing.

DETAILED DESCRIPTION OF EMBODIMENTS

First Embodiment

Figure 1:
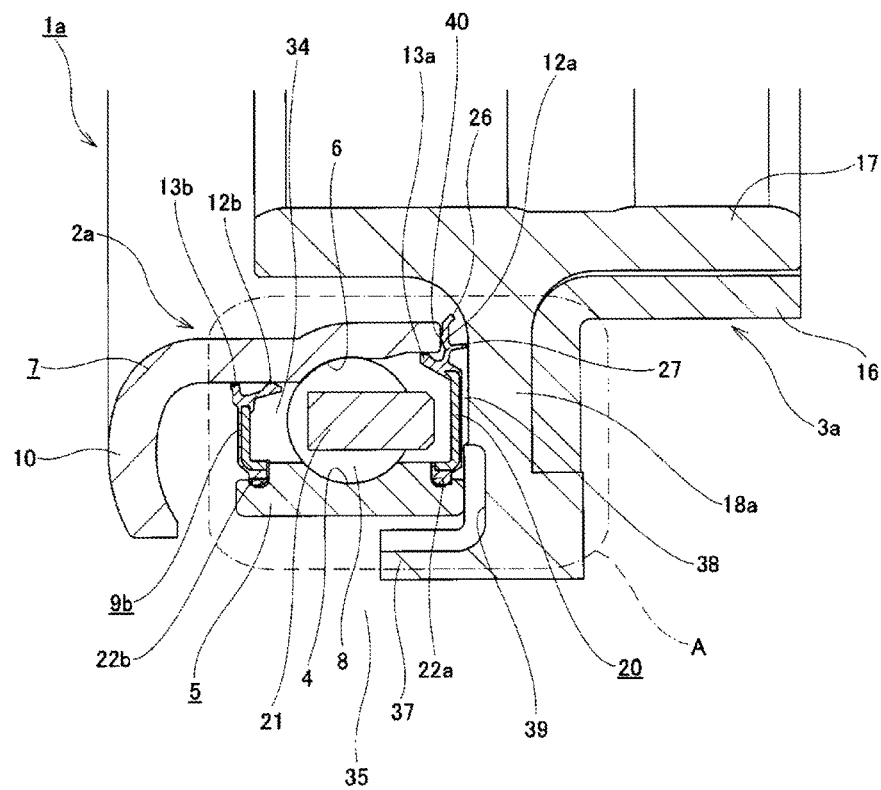
FIG. 1 is a sectional view of a part positioned at a lower end at a using state, illustrating a first embodiment.
Figure 2:
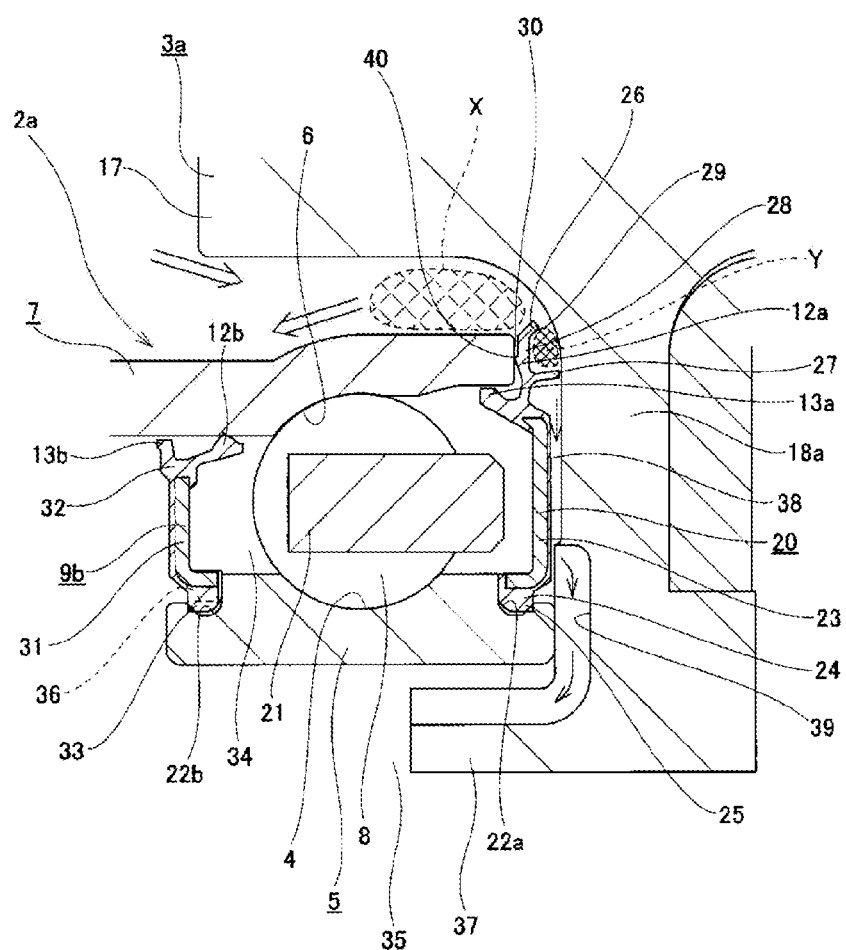
FIG. 2 is an enlarged view of an A part of FIG. 1.
Figure 15:
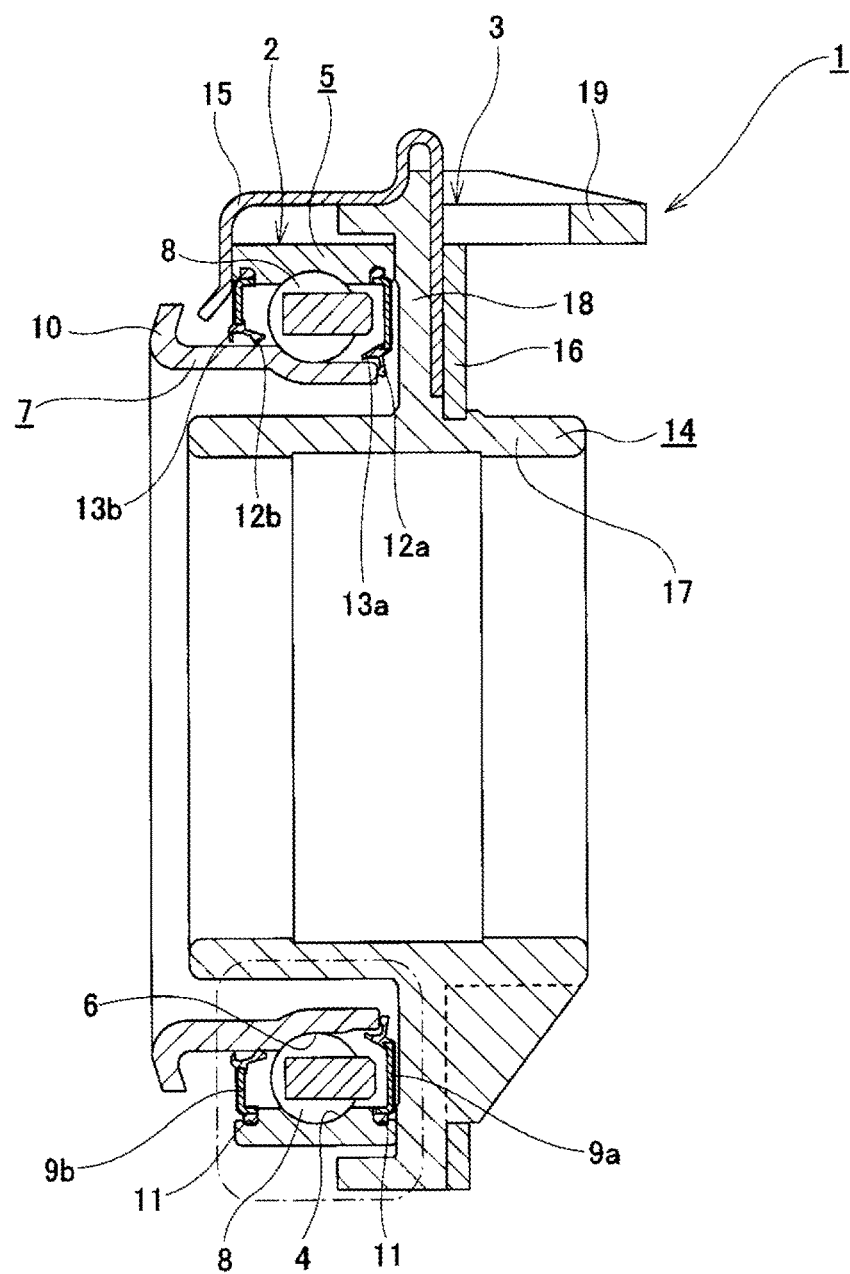
FIG. 15 is a sectional view taken along a line B-O-B of FIG. 16, illustrating an example of the related art.
Figure 16:
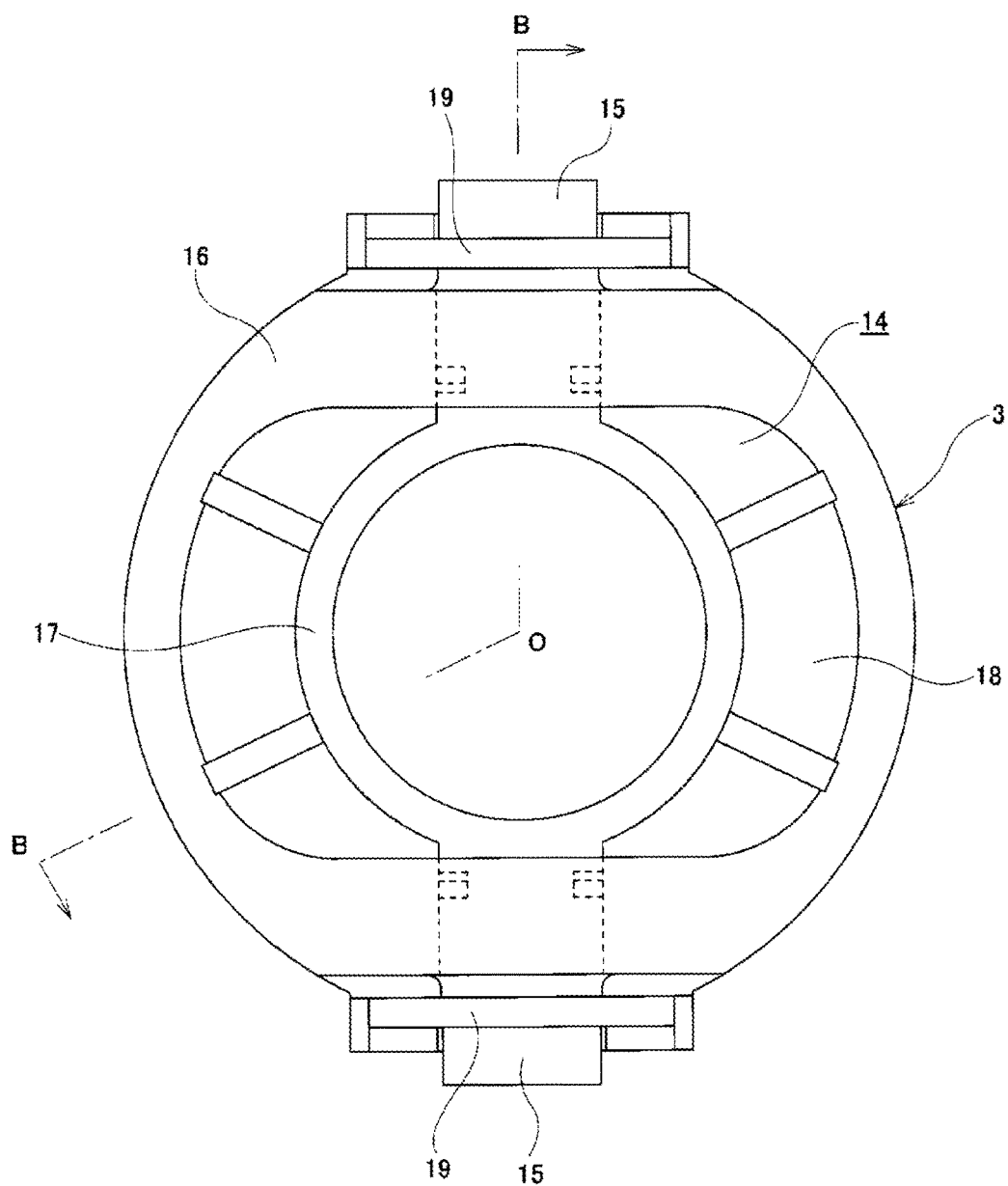
FIG. 16 is a view as seen from a right side of FIG. 15.
Figure 17:
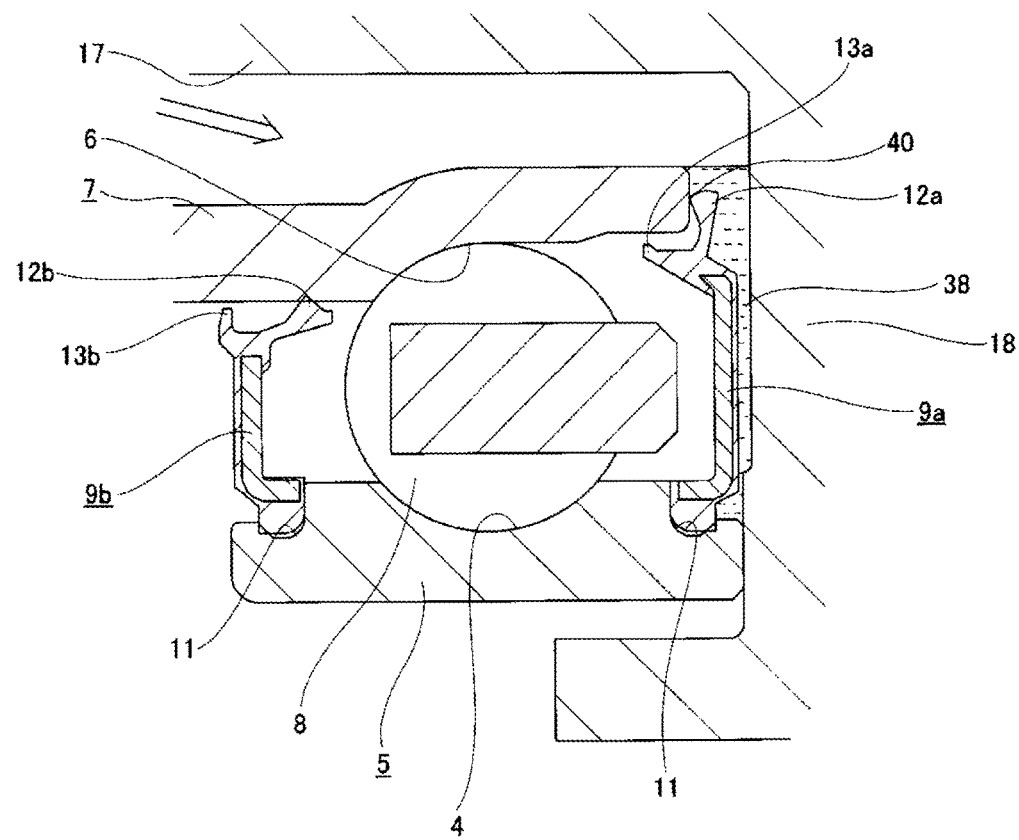
FIG. 17 is an enlarged sectional view of a part positioned at a lower end at a using state in FIG. 15.

A first embodiment of the present invention will be described with reference to FIGS. 1 and 2. This embodiment has a feature in a structure of a seal ring 20, which is arranged at the other axial side (a right side in FIG. 1: a rear side), of a release bearing 2a configuring a clutch release bearing device 1a. This embodiment has a feature in a structure of a flange part 18a configuring a bearing holder 3a. The other configurations and operational effects are basically the same as the related art shown in FIGS. 15 to 17. For this reason, the descriptions and illustrations of the overlapping parts will be omitted or simplified. In the below, the characteristic parts of the embodiment and the parts, which have not been described above, will be mainly described. In the respective embodiments including the first embodiment, the muddy water will be exemplified as a representative foreign matter. However, it should be noted that the other foreign matters except for the muddy water can also be included.

In the first embodiment, the release bearing 2a is also supported to one axial side (a left side in FIGS. 1 and 2) of the flange part 18a having a circular ring shape. The release bearing 2a has an outer ring 5, an inner ring 7, a plurality of balls 8, a cage 21 and a pair of seal rings 20, 9b. The outer ring 5 is a stationary ring having an outer ring raceway 4 of a deep groove type formed on an inner periphery thereof. The inner peripheries of the both axial end portions of the outer ring 5 are formed with a pair of fitting grooves 22a, 22b over an entire circumference. The inner ring 7 is a rotary ring having an inner ring raceway 6 of an angular type formed on an outer periphery thereof. Each ball 8 is provided to be freely rollable with being held by the cage 21 between the outer ring raceway 4 and the inner ring raceway 6.

Both the seal rings 20, 9b are configured to close openings at both axial ends of a rolling element mounting space 34 which exists between the inner periphery of the outer ring 5 and the outer periphery of the inner ring 7 and in which each ball 8 is provided. The seal ring 20 of both the seal rings 20, 9b, which is arranged at the other axial side (a rear side) with axially facing one axial side surface of the flange part 18a, has a metal insert 23 made by forming a metal plate such as a steel plate into a circular ring shape and a seal material 24 integrally coupled to the metal insert 23 and consisting of an elastic material such as elastomer, for example rubber. An fitting portion 25, which is provided at a part of an outer peripheral edge portion of the seal material 24 more protruding radially outward (downward in FIGS. 1 and 2) than an outer peripheral edge portion of the metal insert 23, is engaged with the fitting groove 22a formed on the inner periphery of the other axial end portion of the outer ring 5. Also, a part of an inner diameter-side end portion of the seal material 24, which more protrudes radially inward (upward in FIGS. 1 and 2) than an inner peripheral edge portion of the metal insert 23, is formed with a contact lip 12a, a non-contact lip 13a, a radial non-contact lip 26 and an axial non-contact lip 27.

The non-contact lip 13a has a base end portion fixed to the inner peripheral edge portion of the metal insert 23, and is inclined towards the one axial side (a left side in FIGS. 1 and 2) as it faces radially inward. A tip edge (an inner peripheral edge portion) of the non-contact lip 13a is arranged to closely face the outer periphery of the other axial end portion of the inner ring 7 over an entire circumference, so that a labyrinth seal having an axially long route is formed at the corresponding part.

The contact lip 12a extends radially inward from an axial intermediate portion of an inner periphery of the non-contact lip 13a and has a substantially L-shaped cross section, and one axial end portion of a tip edge thereof is sliding-contacted to a radially central portion of the other axial end surface of the inner ring 7 over an entire circumference. In the meantime, an interference size of the contact lip 12a is the same as the conventional structure shown in FIGS. 15 to 17.

The radial non-contact lip 26 is provided at an inner peripheral edge portion of the seal ring 20, extends radially inward from an inner peripheral edge portion of the contact lip 12a, and has a tip edge positioned at a more radially inner side than the inner periphery of the other axial end portion of the inner ring 7. Particularly, in the first embodiment, a base half part 28 of the radial non-contact lip 26 extends radially to be parallel with the other axial end surface of the inner ring 7, and a tip half part 29 is inclined towards the other axial side (a right side in FIGS. 1 and 2) as it faces radially inward. In the first embodiment, a labyrinth seal 30 having a radially long route is formed between the other axial end surface of the inner ring 7 and one axial side surface of the base half part 28 of the radial non-contact lip 26, radially inward from a sliding contact part 40 between the tip edge of the contact lip 12a and the other axial end surface of the inner ring 7.

The axial non-contact lip 27 extends from a radially central portion (bent portion) of the other axial side surface of the contact lip 12a towards the other axial side (a direction of getting away from the inner ring 7). Particularly, in the first embodiment, the axial non-contact lip 27 is formed to be substantially perpendicular to the base half part 28 of the radial non-contact lip 26. A tip edge of the axial non-contact lip 27 is arranged to closely face one axial side surface of the flange part 18a over an entire circumference.

In contrast, the seal ring 9b provided at one axial side (a front side) has a metal insert 31 made by forming a metal plate such as a steel plate into a circular ring shape and a seal material 32 integrally coupled to the metal insert 31 and consisting of an elastic material such as elastomer, for example rubber. An fitting portion 33, which is provided at a part of an outer peripheral edge portion of the seal material 32 more protruding radially outward than an outer peripheral edge portion of the metal insert 31, is engaged with the fitting groove 22b formed on the inner periphery of one axial end portion of the outer ring 5. Also, a part of an inner diameter-side end portion of the seal material 32, which more protrudes radially inward than an inner peripheral edge portion of the metal insert 31, is formed with a contact lip 12b and a non-contact lip 13b. A tip edge of the contact lip 12b is contacted to an outer periphery of an axial intermediate portion of the inner ring 7 over an entire circumference. Also, a tip edge of the non-contact lip 13b arranged closer to the one axial side than the contact lip 12b is arranged to closely face the outer periphery of the axial intermediate portion of the inner ring 7 over an entire circumference.

Also, in the first embodiment, the fitting portion 33 is formed with one or more air holes 36 for preventing an internal pressure of the rolling element mounting space 34 from increasing by enabling the rolling element mounting space 34 having the ball 8 mounted therein and an external space 35 around the release bearing 2a to communicate with each other. In the meantime, the fitting portion 25 configuring the seal ring 20 is not formed with the air hole.

Also, in the first embodiment, a substantially L-shaped recessed groove 39 for drainage is formed at a part, which is positioned at a lower end at a using state, of one axial side surface of the flange part 18a and an inner periphery of a cover part 37 protruding from an outer peripheral edge portion of the flange part 18a towards the one axial side. The recessed groove 39 for drainage is configured to enable a gap space 38 between the one axial side surface of the flange part 18a and the other axial side surface of the seal ring 20 and the external space 35 existing radially outward from the outer ring 5 to communicate with each other. A radially inner end portion of the recessed groove 39 for drainage opens towards the gap space 38 at a position (a more radially inner position than the other axial end surface of the outer ring 5) at which it axially faces an outer diameter-side part of the seal ring 20.

Incidentally, the clutch release bearing device 1a can be attached with being rotated by 180° with respect to the guide shaft. Therefore, in order to increase the mounting ability of the clutch release bearing device (to prevent erroneous mounting), the recessed groove 39 for drainage may be provided at two diametrically opposite positions (upper and lower end portions at a using state) of the flange part 18a and the cover part 37.

According to the clutch release bearing device 1a of the first embodiment having the above-described configuration, it is possible to suppress an increase in rotating torque of the release bearing 2a configuring the clutch release bearing device 1a, and to improve the sealing performance without increasing a bearing size, a weight, a number of components and cost.

That is, according to the first embodiment, the inner peripheral edge portion of the seal ring 20 is provided with the radial non-contact lip 26 extending radially inward from the inner peripheral edge portion of the contact lip 12a and having the tip edge positioned at the more radially inner side than the inner periphery of the other axial end portion of the inner ring 7. For this reason, it is possible to effectively prevent the muddy water, which is introduced between the outer periphery of the sleeve 17 and the inner periphery of the inner ring 7 at a lower end portion of the clutch release bearing device 1a, from moving to the gap space 38 by the radial non-contact lip 26. In this way, the muddy water of which movement towards the gap space 38 is blocked by the radial non-contact lip 26 is difficult to stay at a part (an X part in FIG. 2) between the inner periphery of the inner ring 7 and the radial non-contact lip 26, is splashed by the inner periphery of the inner ring 7 and is moved towards the one axial side, based on the rotation of the inner ring 7.

Also, in the first embodiment, the radial non-contact lip 26 is provided, so that it is possible to form the labyrinth seal 30 having a radially long route at a radially inner side of the sliding contact part 40. For this reason, it is possible to effectively prevent the muddy water from reaching the sliding contact part 40 that is likely to be an introduction route of the muddy water.

Also, in the first embodiment, the tip edge of the axial non-contact lip 27 is arranged to closely face the one axial side surface of the flange part 18a. For this reason, it is possible to effectively prevent the muddy water from moving towards the gap space 38 (block the muddy water) by the axial non-contact lip 27. The muddy water introduced into a part (a Y part in FIG. 2) between the axial non-contact lip 27 and the radial non-contact lip 26 is moved radially inward (upward) through the radial non-contact lip 26 or is moved radially outward (downward) through the axial non-contact lip 27 due to the vibrations and the like associated with traveling of a vehicle. In the meantime, even when the muddy water stays at the Y part, since there is no introduction route into the release bearing 2a, the sealing performance of the release bearing 2a is not deteriorated. Also, the axial non-contact lip 27 can effectively prevent the muddy water introduced into the gap space 38 from flowing back in a radially inward direction.

Also, in the first embodiment, it is possible to discharge the muddy water introduced into the gap space 38 through the axial non-contact lip 27 to the external space 35 without staying the muddy water in the gap space 38 by the recessed groove 39 for drainage formed ranging from the one axial side surface of the flange part 18a to the inner periphery of the cover part 37. For this reason, it is possible to effectively prevent a situation where the sliding contact part 40 is submerged in the muddy water as a water level of the muddy water rises.

As described above, according to the first embodiment, the seal ring 20 is further formed with the radial non-contact lip 26 and the axial non-contact lip 27, and the recessed groove 39 for drainage is formed from the one axial side surface of the flange part 18a to the inner periphery of the cover part 37, so that it is possible to improve the sealing performance of the release bearing 2a. Also, according to the first embodiment, since it is not necessary to change a size of the interference of the contact lip 12a so as to improve the sealing performance, the activating torque and rotating torque of the release bearing 2a do not increase. Also, since a new seal ring is not provided, the bearing size, the weight, the number of components and the cost do not increase (it is possible to extremely suppress the extent of the increases of the weight and the cost). The other configurations and the operational effects are the same as the above-described conventional structure.

Second Embodiment

Figure 3:
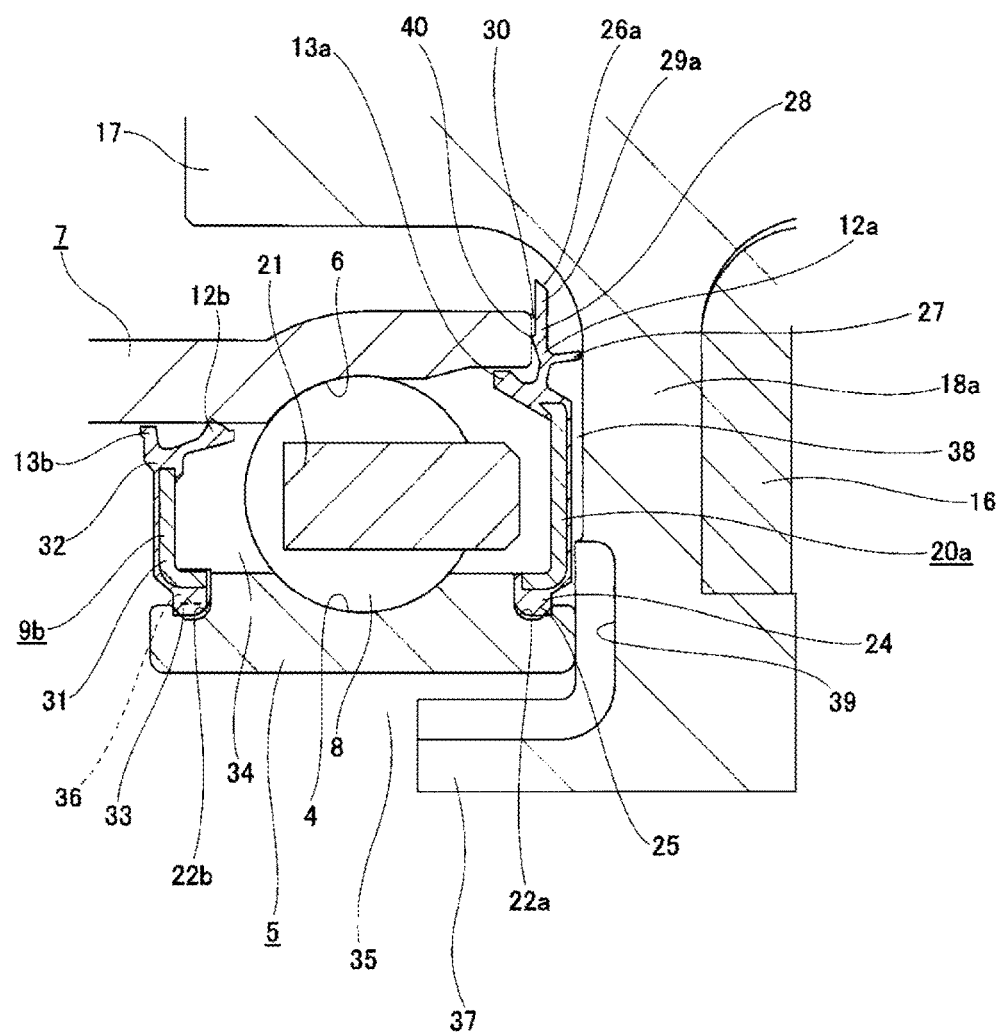
FIG. 3 is an enlarged view illustrating a second embodiment, which is the same as FIG. 2.

A second embodiment of the present invention is described with reference to FIG. 3. The second embodiment is characterized in that a shape of a tip half part 29a of a radial non-contact lip 26a configuring a seal ring 20a is different from the first embodiment. That is, in the second embodiment, the tip half part 29a extends radially to be parallel with the other axial end surface of the inner ring 7 without being axially inclined, like the base half part 28 configuring the radial non-contact lip 26a.

According to the second embodiment having the above configuration, it is possible to increase an amount of protrusion of the tip edge of the radial non-contact lip 26a, radially inward from the inner periphery of the one axial end portion of the inner ring 7, as compared to the first embodiment. For this reason, it is possible to further improve the sealing performance of the release bearing 2a. The other configurations and the operational effects are the same as the first embodiment.

Third Embodiment

Figure 4:
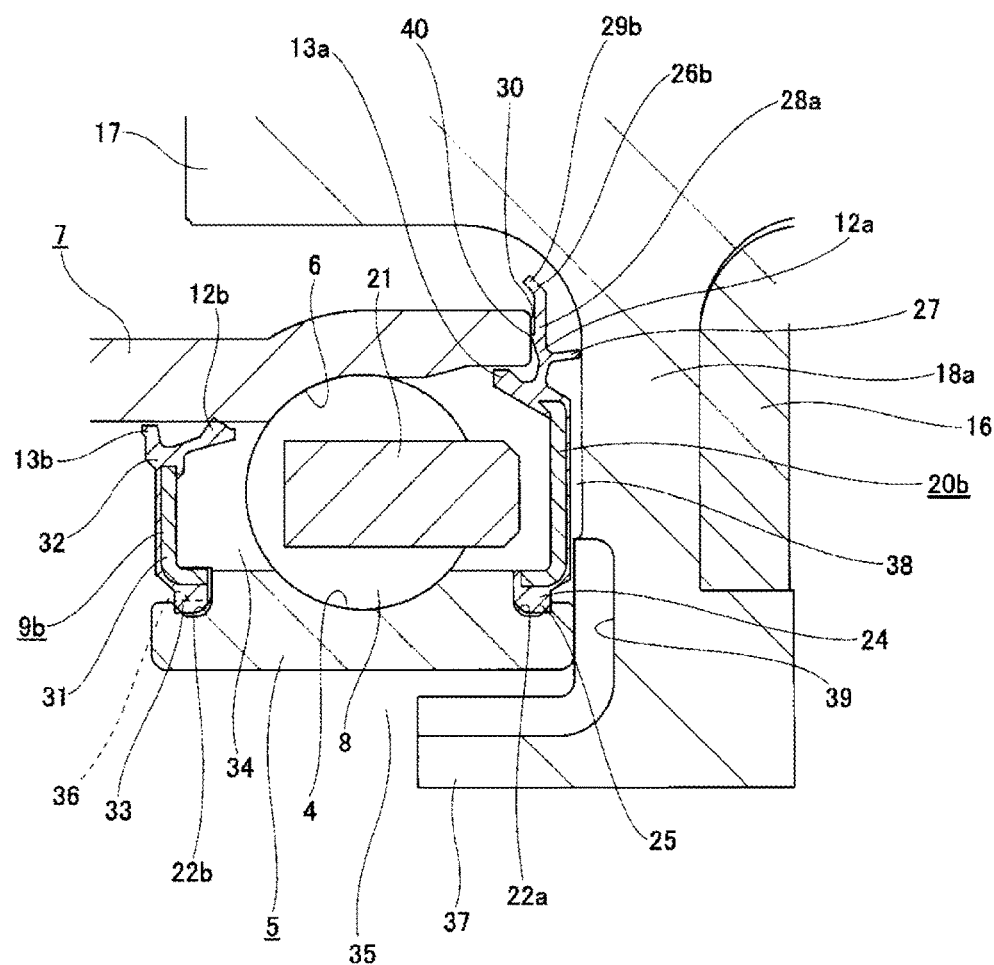
FIG. 4 is an enlarged view illustrating a third embodiment, which is the same as FIG. 2.

A third embodiment of the present invention is described with reference to FIG. 4. The third embodiment is also characterized in that a shape of a tip half part 29b of a radial non-contact lip 26b configuring a seal ring 20b is different from the first and second embodiments. That is, in the third embodiment, the tip half part 29b is inclined towards the one axial side (a left side in FIG. 4) as it faces radially inward. Also, in the third embodiment, the base half part 28a of the radial non-contact lip 26b more extends radially inward than the first embodiment.

According to the third embodiment having the above configuration, it is possible to push and return the muddy water introduced between the outer periphery of the sleeve 17 and the inner periphery of the inner ring 7 towards the one axial side by the tip half part 29b configuring the radial non-contact lip 26b. For this reason, it is possible to effectively prevent the muddy water from staying at the radially inner side of the sliding contact part 40 between the tip edge of the contact lip 12a and the other axial end surface of the inner ring 7. The other configurations and the operational effects are the same as the first embodiment.

Fourth Embodiment

Figure 5:
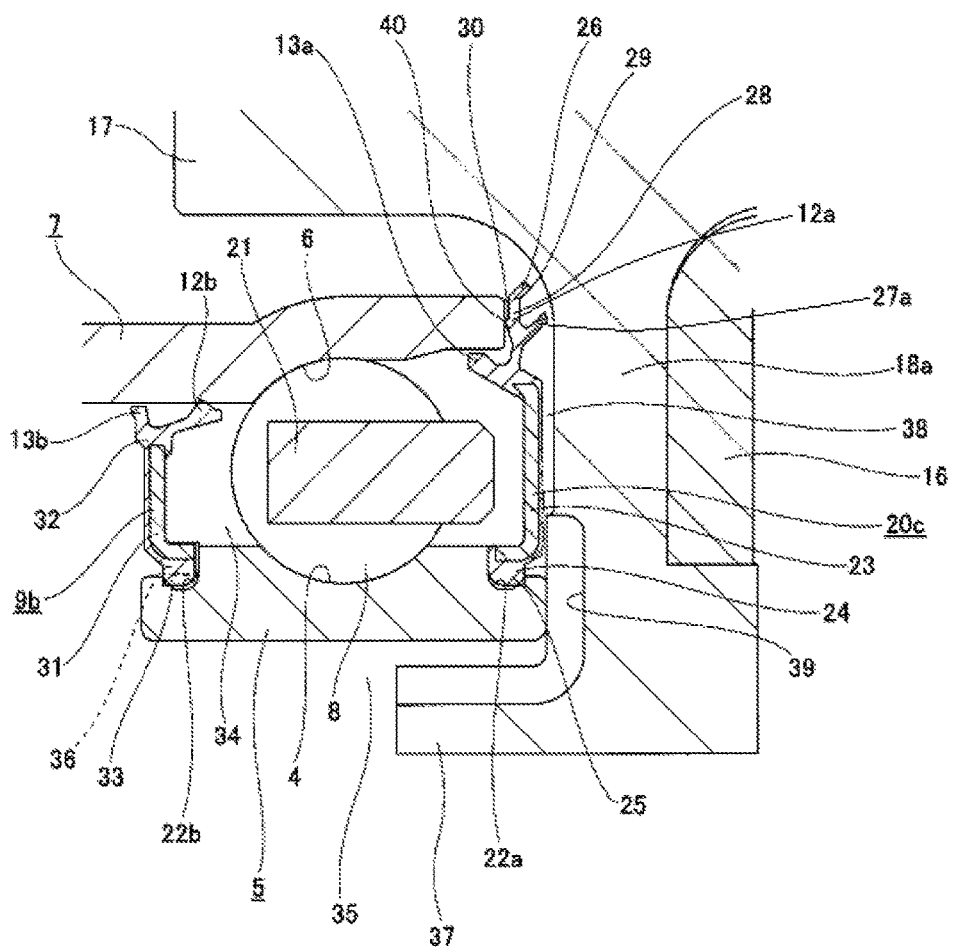
FIG. 5 is an enlarged view illustrating a fourth embodiment, which is the same as FIG. 2.

A fourth embodiment of the present invention is described with reference to FIG. 5. The fourth embodiment is characterized in that a shape of an axial non-contact lip 27a configuring a seal ring 20c is different from the first embodiment. That is, in the fourth embodiment, the axial non-contact lip 27a is inclined in a radially inward direction (an upward side in FIG. 5) as it faces towards the other axial side (a right side in FIG. 5). In the shown example, the axial non-contact lip is inclined by about 40° with respect to a horizontal direction.

According to the fourth embodiment having the above configuration, it is possible to effectively block the muddy water by the axial non-contact lip 27a and to effectively prevent the muddy water from moving towards the gap space 38 (a radially outward side). The other configurations and the operational effects are the same as the first embodiment.

Fifth Embodiment

Figure 6:
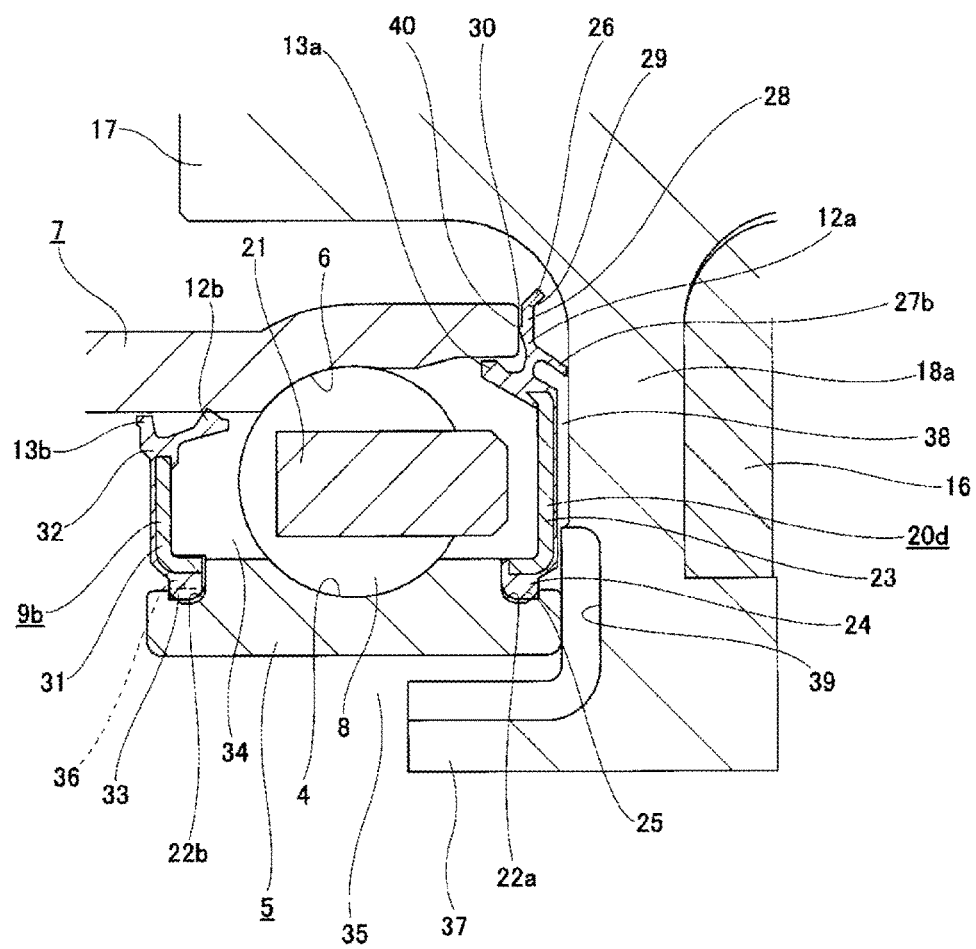
FIG. 6 is an enlarged view illustrating a fifth embodiment, which is the same as FIG. 2.

A fifth embodiment of the present invention is described with reference to FIG. 6. The fifth embodiment is characterized in that a shape of an axial non-contact lip 27b configuring a seal ring 20d is different from the first and fourth embodiments. That is, in the fifth embodiment, the axial non-contact lip 27b is inclined in a radially outward direction (a downward side in FIG. 6) as it faces towards the other axial side (a right side in FIG. 5). In the shown example, the axial non-contact lip is inclined by about 35° with respect to the horizontal direction.

According to the fifth embodiment having the above configuration, it is possible to effectively prevent the foreign matters having moved towards the gap space 38 from flowing back in a radially inward direction by the axial non-contact lip 27b. The other configurations and the operational effects are the same as the first embodiment.

Sixth Embodiment

Figure 7:
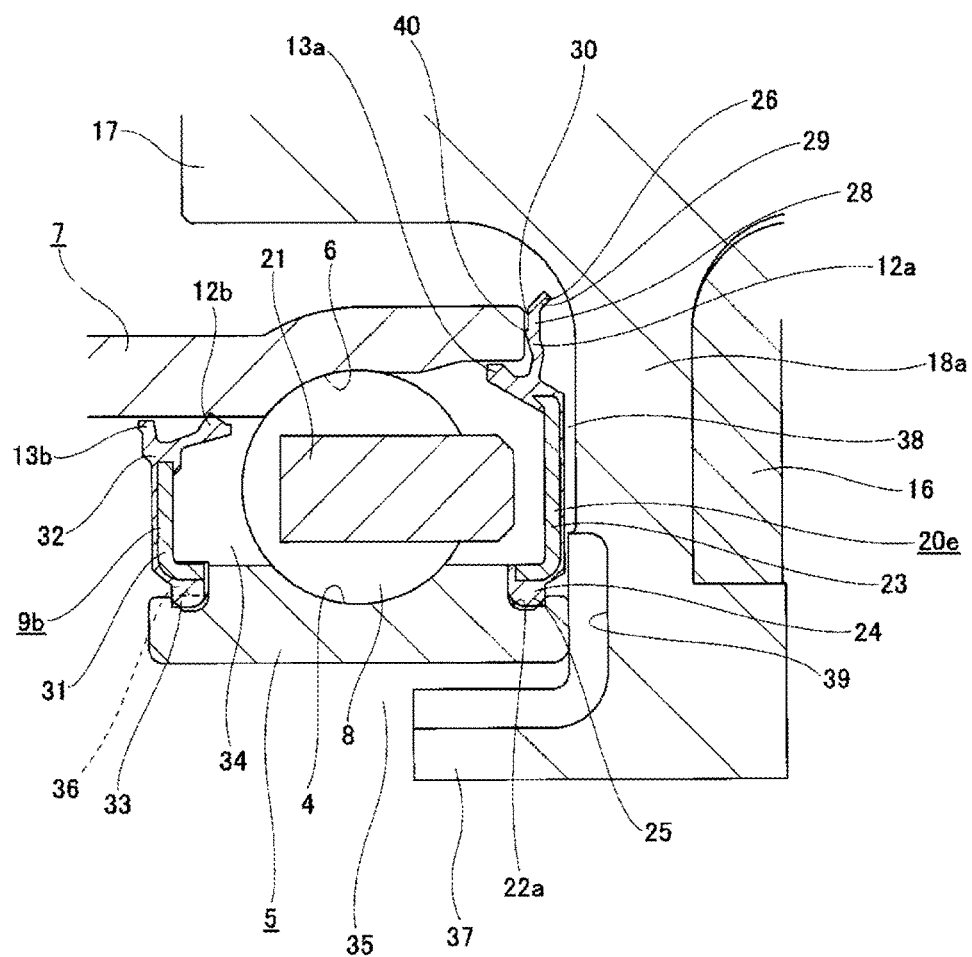
FIG. 7 is an enlarged view illustrating a sixth embodiment, which is the same as FIG. 2.

A sixth embodiment of the present invention is described with reference to FIG. 7. The sixth embodiment is characterized in that the axial non-contact lip is omitted from a seal ring 20e. According to the sixth embodiment having the above configuration, the sealing performance is lowered, as compared to the respective embodiments. However, it is possible to lighten the entire device and to shorten the axial size. The other configurations and the operational effects are the same as the first embodiment.

Seventh Embodiment

Figure 8:
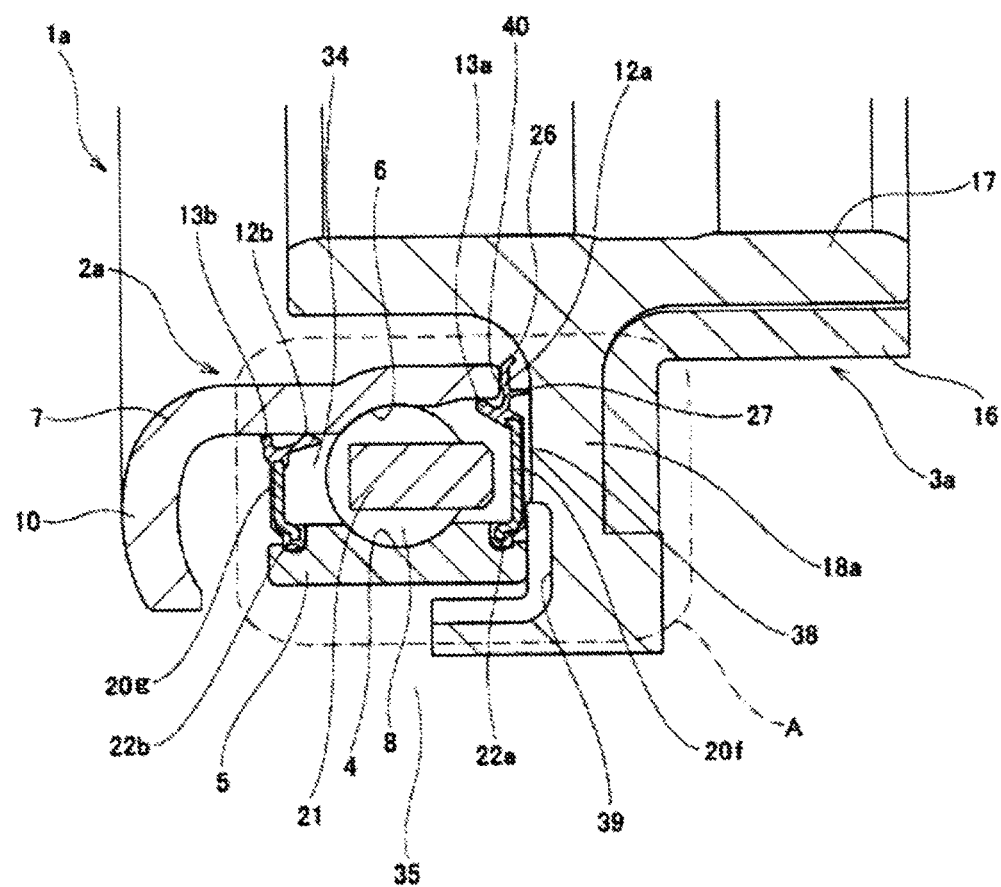
FIG. 8 is a sectional view of a part positioned at a lower end at a using state, illustrating a seventh embodiment.
Figure 9:
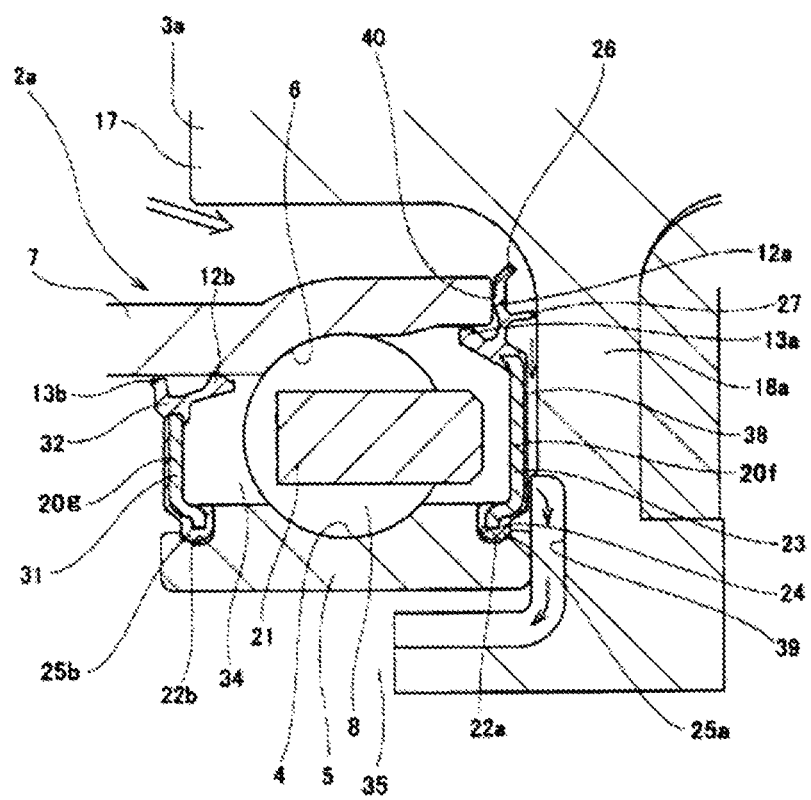
FIG. 9 is an enlarged view of an A part of FIG. 8.

A seventh embodiment of the present invention is described with reference to FIGS. 8 and 9. The seventh embodiment has a feature in a structure of seal rings 20f, 20g, which are arranged at both axial sides, of the release bearing 2a configuring the clutch release bearing device 1a. The other configurations and operational effects are basically the same as the respective embodiments. For this reason, the descriptions and illustrations of the overlapping parts will be omitted or simplified. In the below, the characteristic parts of the seventh embodiment and the parts, which have not been described above, will be mainly described.

The release bearing 2a of the seventh embodiment is also supported to one axial side (a left side in FIG. 8) of the flange part 18a configuring the bearing holder 3a and having a circular ring shape. The release bearing 2a has the outer ring 5, the inner ring 7, the plurality of balls 8, the cage 21, and a pair of seal ring 20f, 20g. The outer ring 5 is a stationary ring having the outer ring raceway 4 of a deep groove type formed on the inner periphery thereof. The inner peripheries of the both axial end portions of the outer ring are formed with a pair of fitting grooves 22a, 22b over an entire circumference. The inner ring 7 is a rotary ring having the inner ring raceway 6 of an angular type formed on the outer periphery thereof. Each ball 8 is provided to be freely rollable with being held by the cage 21 between the outer ring raceway 4 and the inner ring raceway 6.

Both the seal rings 20f, 20g are configured to close openings at both axial ends of the rolling element mounting space 34 which exists between the inner periphery of the outer ring 5 and the outer periphery of the inner ring 7 and in which each ball 8 is provided. The seal ring 20f, which is arranged at the other axial side (a rear side) with axially facing one axial side surface of the flange part 18a, has the metal insert 23 made by forming a metal plate such as a steel plate into a circular ring shape and the seal material 24 integrally coupled to the metal insert 23 and consisting of an elastic material. An fitting portion 25a in which the outer peripheral edge portion of the metal insert 23 is arranged at the outer peripheral edge portion of the seal material 24 (an fitting portion 25 which covers the outer peripheral edge portion of the metal insert 23 at the outer peripheral edge portion of the seal material 24) is engaged with the fitting groove 22a formed on the inner periphery of the other axial end portion of the outer ring 5. Also, a part of an inner diameter-side end portion of the seal material 24, which more protrudes radially inward (upward in FIG. 8) than the inner peripheral edge portion of the metal insert 23, is formed with the contact lip 12a, the non-contact lip 13a, the radial non-contact lip 26 and the axial non-contact lip 27.

The non-contact lip 13a has a base end portion fixed to the inner peripheral edge portion of the metal insert 23. The tip edge (the inner peripheral edge portion) of the non-contact lip 13a is arranged to closely face the outer periphery of the other axial end portion of the inner ring 7 over an entire circumference and forms a labyrinth seal.

The contact lip 12a extends radially inward from the axial intermediate portion of the inner periphery of the non-contact lip 13a. One axial end portion of the tip edge of the contact lip 12a is sliding-contacted to the sliding contact part 40 of the other axial end surface of the inner ring 7 over an entire circumference.

The radial non-contact lip 26 extends radially inward from the inner peripheral edge portion of the contact lip 12a to be parallel with the other axial end surface of the inner ring 7. The tip edge of the radial non-contact lip 26 is positioned at a more radially inner side than the inner periphery of the other axial end portion of the inner ring 7. A labyrinth seal is formed between the other axial end surface of the inner ring 7 and the radial non-contact lip 26, radially inward from the sliding contact part 40. Further, the tip edge of the radial non-contact lip 26 is arranged to closely face a curve connecting the outer periphery of the sleeve 17 and the one axial side surface of the flange part 18a, over an entire circumference.

The axial non-contact lip 27 extends from the radially central portion of the other axial side surface of the contact lip 12a towards the other axial side, and a tip edge thereof is arranged to closely face the one axial side surface of the flange part 18a over an entire circumference.

On the other hand, the seal ring 20g provided at one axial side (a front side) has the metal insert 31 made by forming a metal plate such as a steel plate into a circular ring shape and the seal material 32 integrally coupled to the metal insert 31 and consisting of an elastic material. An fitting portion 25b, in which the outer peripheral edge portion of the metal insert 31 is arranged (the outer peripheral edge portion of the metal insert 31 is covered) at the outer peripheral edge portion of the seal material 32, is engaged with the fitting groove 22b formed on the inner periphery of one axial end portion of the outer ring 5. Also, a part of an inner diameter-side end portion of the seal material 32, which more protrudes radially inward than the inner peripheral edge portion of the metal insert 31, is formed with the contact lip 12b and the non-contact lip 13b. The tip edge of the contact lip 12b is contacted to the outer periphery of the axial intermediate portion of the inner ring 7 over an entire circumference, and the tip edge of the non-contact lip 13b is arranged to closely face the outer periphery of the axial intermediate portion of the inner ring 7 over an entire circumference.

Also, the substantially L-shaped recessed groove 39 for drainage configured to enable the gap space 38 between the one axial side surface of the flange part 18a and the other axial side surface of the seal ring 20f and the external space 35 existing radially outward from the outer ring 5 to communicate with each other is formed at a part, which is positioned at a lower end at a using state, of one axial side surface of the flange part 18a. A radially inner end portion of the recessed groove 39 for drainage opens towards the gap space 38 at the more radially inner position than the other axial end surface of the outer ring 5.

According to the clutch release bearing device 1a of the seventh embodiment having the above-described configuration, it is possible to suppress an increase in rotating torque of the release bearing 2a, and to improve the sealing performance without increasing the bearing size, the weight, the number of components and the cost. That is, according to the seventh embodiment, the seal ring 20f is configured so that the fitting portion 25a having the outer peripheral edge portion of the metal insert 23 arranged in the seal material 24 is engaged with the fitting groove 22a of the outer ring 5 by extending the metal insert 23 towards the fitting portion 25a. By this configuration, the stiffness of the fitting portion 25a is increased, so that the deformation of the seal material 24 upon the press-fitting into the fitting groove 22a is suppressed. Therefore, it is possible to improve the adhesiveness between the fitting portion 25a and the fitting groove 22a. Likewise, the seal ring 20g is configured so that the metal insert 31 extends towards the fitting portion 25b and the stiffness of the fitting portion 25b is thus increased to improve the adhesiveness.

Also, since the seal ring 20f is provided with the radial non-contact lip 26, it is possible to prevent the muddy water introduced between the outer periphery of the sleeve 17 and the inner periphery of the inner ring 7 from moving to the gap space 38. Further, it is possible to discharge the muddy water introduced into the gap space 38 through the radial non-contact lip 26 to the external space without staying the muddy water in the gap space 38 by the recessed groove 39 for drainage formed at the one axial side surface of the flange part 18a. For this reason, it is possible to prevent a situation where the fitting surface between the fitting groove 22a and the fitting portion 25a and the sliding contact part 40 are submerged in the muddy water.

As described above, according to the seventh embodiment, the metal insert 23 (31) extends towards the fitting portion 25a (25b), so that it is possible to improve the sealing performance of the release bearing 2a. Further, when the seal ring 20f is formed with the radial non-contact lip 26 and the axial non-contact lip 27 and the flange part 18a is formed with the recessed groove 39 for drainage, it is possible to further improve the sealing performance. Also, according to the seventh embodiment, since it is not necessary to change a size of the interference of the contact lip 12a so as to improve the sealing performance, the activating torque and rotating torque of the release bearing 2a do not increase. Also, since a new seal ring is not provided, the bearing size, the weight and the number of components do not increase. The other configurations and the operational effects are the same as the first embodiment.

Eighth Embodiment

Figure 10:
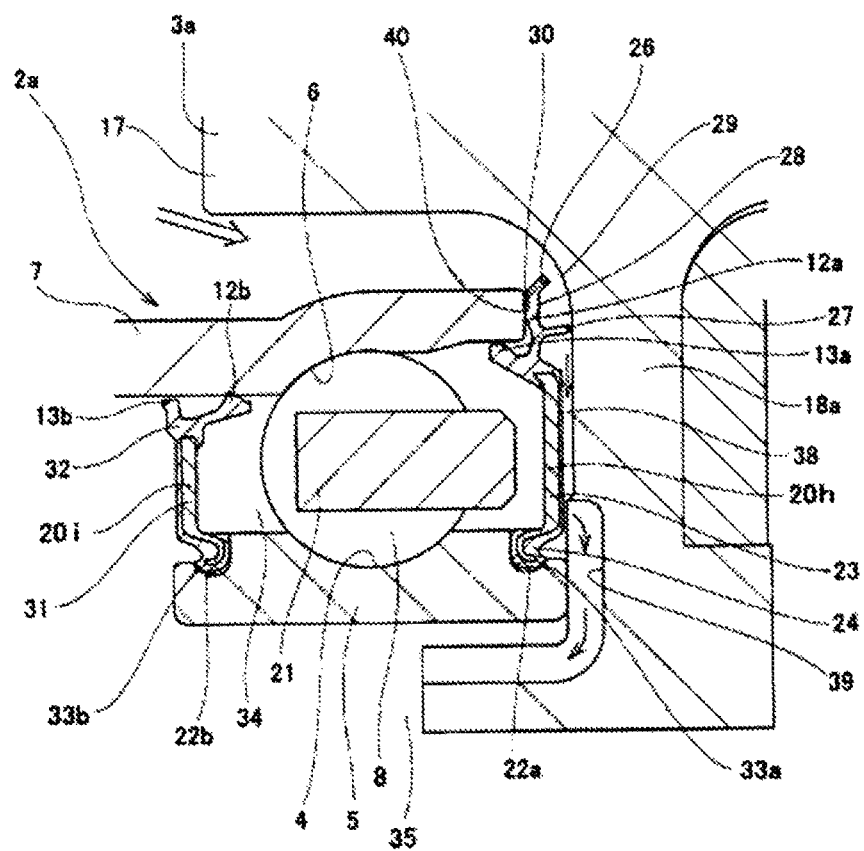
FIG. 10 is an enlarged view illustrating an eighth embodiment, which is the same as FIG. 9.

An eighth embodiment of the present invention is described with reference to FIG. 10. In the clutch release bearing device of the eighth embodiment, fitting portions 33a, 33b are respectively crimped to the fitting grooves 22a, 22b of the outer ring 5, so that seal rings 20h, 20i are fixed to the outer ring 5. The metal insert 23 configuring the seal ring 20h has an outer peripheral end portion thinner than the other portions, and extends to a tip portion (an outer peripheral end portion) of the fitting portion 33a with being entirely covered by the seal material 24. When the fitting portion 33a is crimped to the fitting groove 22a, the metal insert 23 is plastically deformed in a shape conforming to the fitting groove 22a, so that the seal ring 20h is rigidly fixed to the outer ring 5. In this way, since the seal material 24 is strongly pressed to the fitting groove 22a by the crimped metal insert 23, the adhesiveness with the fitting groove 22a is improved. The fitting portion 33b of the seal ring 20i having the same configuration is also crimped to the fitting groove 22b. The other configurations and the operational effects are the same as the seventh embodiment.

Ninth Embodiment

Figure 11:
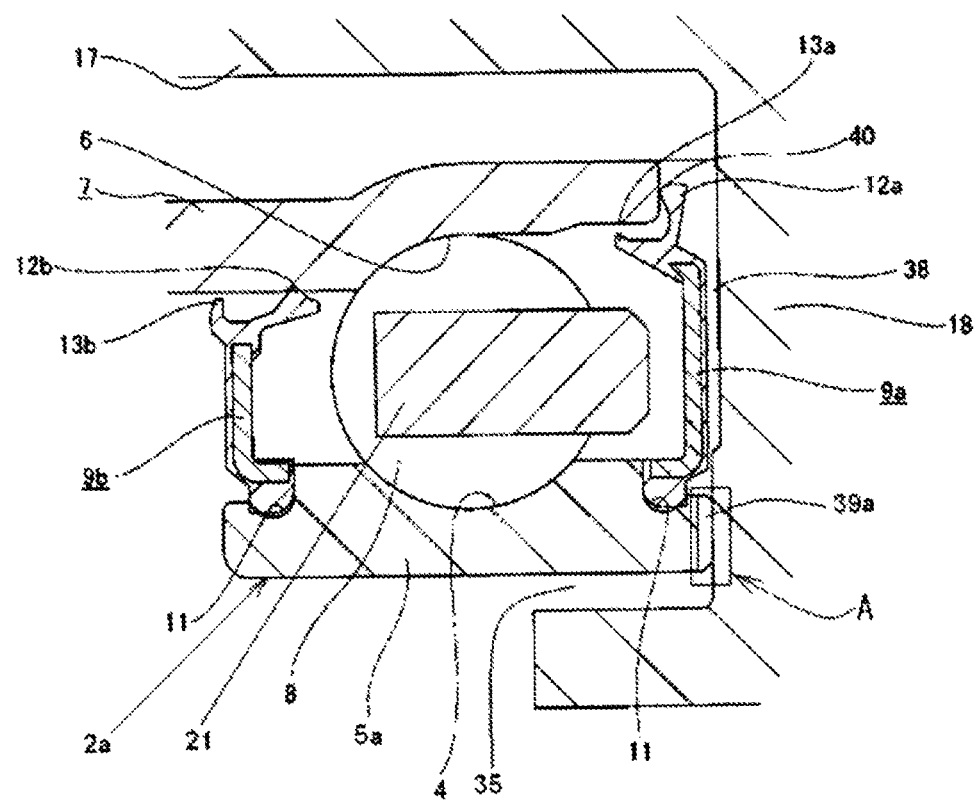
FIG. 11 is a sectional view of a part positioned at a lower end at a using state, illustrating a ninth embodiment.
Figure 12:
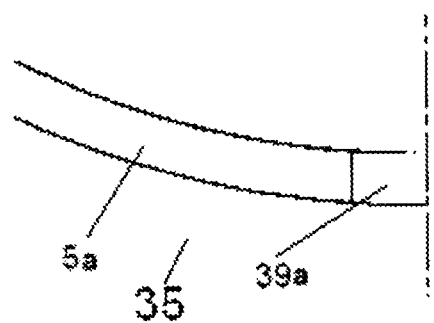
FIG. 12 is a side view of an A part of FIG. 11.

A ninth embodiment of the present invention is described with reference to FIGS. 11 and 12. The ninth embodiment has a feature in a structure of an outer ring 5a of the release bearing 2a configuring the clutch release bearing device. The other configurations and operational effects are simply described. In the below, the characteristic parts of the ninth embodiment and the parts, which have not been described above, will be mainly described.

The release bearing 2a of the ninth embodiment is also supported to one axial side (a left side in FIG. 11) of the flange part 18 configuring the bearing holder 3 and having a circular ring shape, and has the outer ring 5a, the inner ring 7, the plurality of balls 8, the cage 21, and a pair of seal ring 9a, 9b. The outer ring 5a is a stationary ring having the outer ring raceway 4 of a deep groove type formed on the inner periphery thereof. The inner peripheries of the both axial end portions of the outer ring are formed with a pair of fitting grooves 11, 11 over an entire circumference. The inner ring 7 is a rotary ring having the inner ring raceway 6 of an angular type formed on the outer periphery thereof. Each ball 8 is provided to be freely rollable with being held by the cage 21 between the outer ring raceway 4 and the inner ring raceway 6.

Both the seal rings 9a, 9b are engaged with the fitting grooves 11, 11. Also, both the seal rings 9a, 9b are configured to close openings at both axial ends of the rolling element mounting space which exists between an inner periphery of the outer ring 5a and the outer periphery of the inner ring 7 and in which each ball 8 is provided.

A recessed groove 39a for drainage is formed at a part, which is positioned at a lower end at a using state, of an axial end portion of the outer ring 5a facing the one axial side surface of the flange part 18. The recessed groove 39a is configured to enable the gap space 38 between the one axial side surface of the flange part 18 and the other axial side surface of the seal ring 9a and the external space 35 existing radially outward (downward) from the outer ring 5a to communicate with each other According to the clutch release bearing device of the ninth embodiment having the above-described configuration, it is possible to improve the sealing performance of the release bearing 2a without increasing the bearing size. That is, according to the ninth embodiment, it is possible to discharge the muddy water introduced into the gap space 38 to the external space 35 without staying the muddy water in the gap space 38 by the recessed groove 39a for drainage. For this reason, it is possible to effectively prevent a situation where the sliding contact part 40 is submerged in the muddy water as a water level of the muddy water rises.

Like this, according to the ninth embodiment, the outer ring 5a is formed with the recessed groove 39a for drainage, so that it is possible to improve the sealing performance of the release bearing 2a. The other configurations and the operational effects are the same as the above-described conventional structure.

Tenth Embodiment

Figure 13:
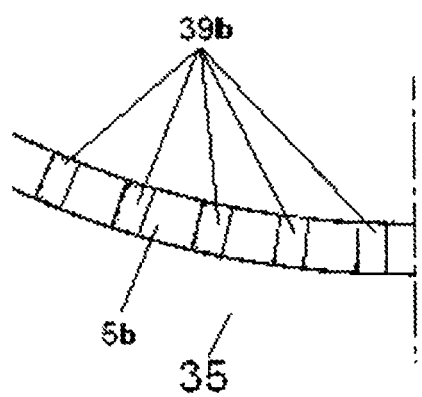
FIG. 13 is a side view illustrating a tenth embodiment, which is the same as FIG. 12.

A tenth embodiment of the present invention is described with reference to FIG. 13. The tenth embodiment is characterized in that a plurality of recessed grooves 39b for drainage are provided in a circumferential direction of the outer ring 5b. For example, a plurality of recessed grooves 39b for drainage may be provided over en entire circumference of the outer ring 5b. According to this configuration, it is not necessary to specify a circumferential position of the recessed groove 39a for drainage, like the ninth embodiment. Therefore, it is not necessary to consider the circumferential positions of the recessed grooves 39b for drainage upon the assembling.

Eleventh Embodiment

Figure 14:
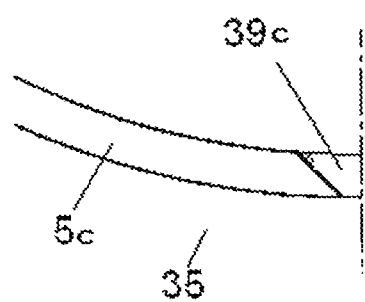
FIG. 14 is a side view illustrating an eleventh embodiment, which is the same as FIG. 12.

An eleventh embodiment of the present invention is described with reference to FIG. 14. The eleventh embodiment is characterized in that a circumferential width of an outer diameter-side of the recessed groove 39c for drainage of an outer ring 5c is made to be smaller than a circumferential width of an inner diameter-side. By doing so, it is possible to prevent the muddy water from flowing back from the external space 35. In the meantime, although not shown, a plurality of the recessed grooves 39c for drainage may be provided in a circumferential direction.

Regarding the shapes of the radial non-contact lip and the axial non-contact lip, the present invention is not limited to the shown structures and can adopt a variety of shapes. Also, the formation position, shape and the like of the recessed groove for drainage are not limited to the shown structures and can be appropriately changed. Specifically, in the first to eighth embodiments, the recessed groove for drainage may be formed only on one axial side surface of the flange part without being formed on the inner periphery of the cover part. Also, in the ninth to eleventh embodiments, the seal ring 9a provided at the other axial side (a rear side) may be configured as the seal ring having the contact lip 12a, the non-contact lip 13a, the radial non-contact lip 26 and the axial non-contact lip 27 formed thereto, like the respective embodiments.

The subject application is based on a Japanese Patent Application No. 2013-259028 filed on Dec. 16, 2013, a Japanese Patent Application No. 2014-128778 filed on Jun. 24, 2014 and a Japanese Patent Application No. 2014-170383 filed on Aug. 25, 2014, the contents thereof being herein incorporated for reference.

REFERENCE NUMERALS 1, 1a: clutch release bearing device; 2, 2a: release bearing; 3, 3a: bearing holder; 4: outer ring raceway; 5, 5a, 5b, 5c: outer ring; 6: inner ring raceway; 7: inner ring; 8: ball; 9a, 9b: seal ring; 10: pushing part; 11: fitting groove; 12a, 12b: contact lip; 13a, 13b: non-contact lip; 14: resin molded component; 15: retaining spring; 16: anvil; 17: sleeve; 18, 18a: flange part; 19: guide plate part; 20, 20a to 20i: seal ring; 21: cage; 22a, 22b: fitting groove; 23: core bar; 24: seal material; 25, 25a, 25b: fitting portion; 26, 26a, 26b: radial non-contact lip; 27, 27a, 27b: axial non-contact lip; 28, 28a: base half part; 29, 29a, 29b: tip half part; 30: labyrinth seal; 31: core bar; 32: seal material; 33, 33a, 33b: fitting portion; 34: rolling element mounting space; 35: external space; 36: air hole; 37: cover part; 38: gap space; 39, 39a, 39b, 39c: recessed groove for drainage; 40: sliding contact part

The invention claimed is:

1. A release bearing comprising:
an outer ring having an outer ring raceway formed on an inner periphery thereof,
an inner ring having an inner ring raceway formed on an outer periphery thereof,
a plurality of rolling elements provided to be freely rollable between the outer ring raceway and the inner ring raceway, and
a pair of seal rings of which outer peripheral edge portions are respectively to be engaged to inner peripheries of both axial end portions of the outer ring, the seal rings being configured to close openings at both axial ends of a space which exists between the inner periphery of the outer ring and the outer periphery of the inner ring and in which the rolling elements are provided,
wherein an inner diameter-side end portion of one of the pair of seal rings is provided with a contact lip of which a tip edge is sliding-contacted to an axial end surface of the inner ring over an entire circumference and a non-contact lip of which a tip edge is arranged to closely face an outer periphery of an axial end portion of the inner ring over an entire circumference,
wherein an inner peripheral edge portion of the one seal ring is provided with a radial non-contact lip extending radially inward from an inner peripheral edge portion of the contact lip and having a tip edge positioned at a more radially inner side than an inner periphery of the axial end portion of the inner ring, and
wherein the axial end surface of the inner ring and an axial side surface of the radial non-contact lip are arranged to face each other, radially inward from a sliding contact part between the tip edge of the contact lip and the axial end surface of the inner ring, and
wherein one of axial side surfaces of the contact lip, which is an opposite surface to a surface facing the axial end surface of the inner ring, is provided with an axial non-contact lip extending axially.

2. The release bearing according to claim 1, wherein the inner peripheries of both axial end portions of the outer ring are provided with fitting grooves in which fitting portions of the pair of seal rings are to be fixed,
wherein each seal ring, of the pair of seal rings has a core bar and a seal material respectively, and
wherein the core bar extends towards the fitting portion with being covered by the seal material.

3. A clutch release bearing device comprising:
a bearing holder having a cylindrical sleeve configured to be slidable along a shaft and a flange part having a circular ring shape and protruding radially outward from an outer periphery of the sleeve, and
a release bearing supported at one axial side of the flange part,
wherein the release bearing is the release bearing according to claim 1,
wherein the one seal ring axially faces the flange part, and
wherein a recessed groove for drainage configured to enable a gap space between one axial side surface of the flange part and the other axial side surface of the seal ring and an external space existing radially outward from the outer ring to communicate with each other is formed at a part, which is positioned at a lower end in a vertical direction at a using state, of one axial side surface of the flange part.

4. The clutch release bearing device according to claim 3, wherein a tip edge of the radial non-contact lip is arranged to face the sleeve or the flange part over an entire circumference.

* * * * *